(12) United States Patent
Barbir et al.

(10) Patent No.: US 9,118,674 B2
(45) Date of Patent: Aug. 25, 2015

(54) METHODS AND PROCESSES FOR STORING AND UTILIZING STATE INFORMATION FOR SERVICE PROVIDERS

(71) Applicant: Bank of America, Charlotte, NC (US)

(72) Inventors: Abdulkader Barbir, Ontario (CA); Radu Marian, Indian Trail, NC (US); Dominique Nguyen, Concord, CA (US)

(73) Assignee: Bank of America Corporation, Charlotte, NC (US)

( * ) Notice: Subject to any disclaimer, the term of this patent is extended or adjusted under 35 U.S.C. 154(b) by 131 days.

(21) Appl. No.: 13/685,100

(22) Filed: Nov. 26, 2012

(65) Prior Publication Data

US 2014/0150065 A1    May 29, 2014

(51) Int. Cl.
*G06F 7/04* (2006.01)
*H04L 29/06* (2006.01)
*H04L 29/08* (2006.01)

(52) U.S. Cl.
CPC .............. *H04L 63/10* (2013.01); *H04L 67/02* (2013.01)

(58) Field of Classification Search
CPC ................................. H04L 63/10; H04L 67/02
USPC ................. 726/2, 3, 4; 709/217; 715/745
See application file for complete search history.

(56) References Cited

U.S. PATENT DOCUMENTS

| | | | |
|---|---|---|---|
| 5,875,296 A * | 2/1999 | Shi et al. | 726/5 |
| 5,963,915 A * | 10/1999 | Kirsch | 705/26.8 |
| 6,105,131 A | 8/2000 | Carroll | |
| 6,185,683 B1 | 2/2001 | Ginter et al. | |
| 6,246,989 B1 | 6/2001 | Polcyn | |
| 6,256,737 B1 | 7/2001 | Bianco et al. | |
| 6,357,010 B1 | 3/2002 | Viets et al. | |
| 6,427,209 B1 | 7/2002 | Brezak, Jr. et al. | |
| 6,473,508 B1 | 10/2002 | Young et al. | |
| 6,898,299 B1 | 5/2005 | Brooks | |
| 6,957,199 B1 | 10/2005 | Fisher | |
| 6,970,918 B2 * | 11/2005 | Brown et al. | 709/219 |
| 7,003,560 B1 | 2/2006 | Mullen et al. | |
| 7,676,439 B2 | 3/2010 | Tattan et al. | |
| 7,865,449 B2 | 1/2011 | Tattan et al. | |
| 7,941,380 B2 | 5/2011 | Tattan et al. | |
| 2001/0027527 A1 | 10/2001 | Khidekel et al. | |
| 2002/0078361 A1 | 6/2002 | Giroux et al. | |
| 2004/0254848 A1 | 12/2004 | Golan et al. | |
| 2006/0161549 A1 | 7/2006 | Bartkowiak et al. | |
| 2007/0234067 A1 | 10/2007 | Nanavati et al. | |
| 2007/0291996 A1 | 12/2007 | Hoffman et al. | |
| 2008/0059250 A1 | 3/2008 | Joao | |
| 2010/0312708 A1 | 12/2010 | Hutchison et al. | |
| 2012/0089471 A1 * | 4/2012 | Comparelli | 705/18 |

(Continued)

*Primary Examiner* — Samson Lemma
(74) *Attorney, Agent, or Firm* — Banner & Witcoff, Ltd.; Michael A. Springs

(57) ABSTRACT

Methods, computer-readable media, and apparatuses are disclosed for storing and utilizing state information for service providers. In one aspect of the invention, the methods, processes, or apparatus may include one or more of the following steps: 1) storing state information on a vault; 2) requesting state information on the vault from a receiving party and a device and providing identification to the vault; 3) authenticating and certifying the request from the receiving party; 4) providing the state information to the receiving party; 5) using the state information on the device; and 6) returning the state information to the vault. An additional aspect of the invention provides a method and/or process for storing and utilizing web-based cookies on a cloud environment for service providers.

20 Claims, 4 Drawing Sheets

(56) References Cited

U.S. PATENT DOCUMENTS

| | | | |
|---|---|---|---|
| 2012/0260327 A1* | 10/2012 | Lissick | 726/9 |
| 2013/0060838 A1* | 3/2013 | Yaffe | 709/203 |
| 2013/0125012 A1* | 5/2013 | Ganesan et al. | 715/745 |
| 2013/0246563 A1* | 9/2013 | Cardozo | 709/217 |

\* cited by examiner

METHODS AND PROCESSES FOR STORING AND UTILIZING STATE INFORMATION FOR SERVICE PROVIDERS

FIELD

Aspects of the embodiments relate to methods, computer readable media, apparatuses, or computer systems that store and utilize state information for service providers.

BACKGROUND

Generally, state information or a small piece of data may be sent from a website and stored on a user's web browser. This state information may also be referred to as a cookie, which may also be known as an HTTP cookie, web cookie, web-based cookie, or browser cookie. A cookie may be generally a small piece of data sent from a website and stored in a user's web browser while a user is browsing a website. When the user browses the same website in the future, the data stored in the cookie can be retrieved by the website to notify the website of the user's previous activity. Cookies were designed to be a reliable mechanism for websites to remember the state information of the website or activity the user had taken in the past. This state information may include clicking particular buttons, logging in, or a record of which pages were visited by the user even months or years ago.

Other kinds of cookies perform essential functions in the modern Web. Perhaps most importantly, authentication cookies are the most common method used by web servers to know whether the user is logged in or not, and which account they are logged in under. Without such a mechanism, the site would not know whether to send a page containing sensitive information, or require the user to authenticate himself by logging-in. The security of an authentication cookie generally depends on the security of the issuing website and the user's web browser. If not implemented correctly, a cookie's data can be intercepted by someone trying to gain unapproved access to the user's data and possibly to the originating website.

BRIEF SUMMARY

Aspects of the embodiments address one or more of the issues mentioned above by disclosing methods, computer readable media, and apparatuses for storing and utilizing state information for service providers.

According to an aspect of the invention, a computer-assisted method that provides a method for storing and utilizing state information for service providers. The method may include the steps of: 1) storing a web-based cookie on a cloud environment; 2) requesting the web-based cookie on the cloud environment from a receiving party and a device and providing identification to the cloud environment; 3) authenticating and certifying the request from the receiving party; 4) providing the web-based cookie to the receiving party; 5) using the web-based cookie on the device; and 6) returning the web-based cookie to the cloud environment.

According to an aspect of the invention, a computer-assisted method that provides a system for storing and utilizing state information for service providers. The method may include the steps of: 1) storing a web-based cookie on an electronic vault; 2) requesting the web-based cookie on the electronic vault from a receiving party and a device and providing identification to the electronic vault; 3) authenticating and certifying the request from the receiving party; 4) providing the web-based cookie to the receiving party; 5) using the web-based cookie on the device; and 6) returning the web-based cookie to the electronic vault.

According to an aspect of the invention, a computer-assisted method that provides a system for storing and utilizing state information for service providers. The method may include the steps of: 1) storing state information on a vault; 2) requesting state information on the vault from a receiving party and a device and providing identification to the vault; 3) authenticating and certifying the request from the receiving party; 4) providing the state information to the receiving party; 5) using the state information on the device; and 6) returning the state information to the vault.

According to another aspect of this invention, an apparatus may comprise: at least one memory; and at least one processor coupled to the at least one memory and configured to perform, based on instructions stored in the at least one memory: 1) storing state information on an electronic vault; 2) requesting state information on the electronic vault from a receiving party and a device and providing identification to the electronic vault; 3) authenticating and certifying the request from the receiving party; 4) providing the state information to the receiving party; 5) using the state information on the device; and 6) returning the state information to the electronic vault.

According to another aspect of the invention, a computer-readable storage medium storing computer-executable instructions that, when executed, cause a processor to perform a method may comprise: 1) storing state information on a vault; 2) requesting state information on the vault from a receiving party and a device and providing identification to the vault; 3) authenticating and certifying the request from the receiving party; 4) providing the state information to the receiving party; 5) using the state information on the device; and 6) returning the state information to the vault.

These and other aspects of the embodiments are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

In accordance with various aspects of the invention, methods, computer-readable media, and apparatuses are disclosed for storing and utilizing state information for service providers. This method/process may enhance privacy and enables a system of trust with the consumer and service providers or webservices. Additionally, the method/process may give the consumer an additional security mechanism because the consumer does not need to worry about cookie stealing, impersonation, and so forth. The method/process may provide a one-stop shop where the consumer's user preferences and the ways the consumer wants to do business may all be stored within the state information and the cookie.

Figure 1:
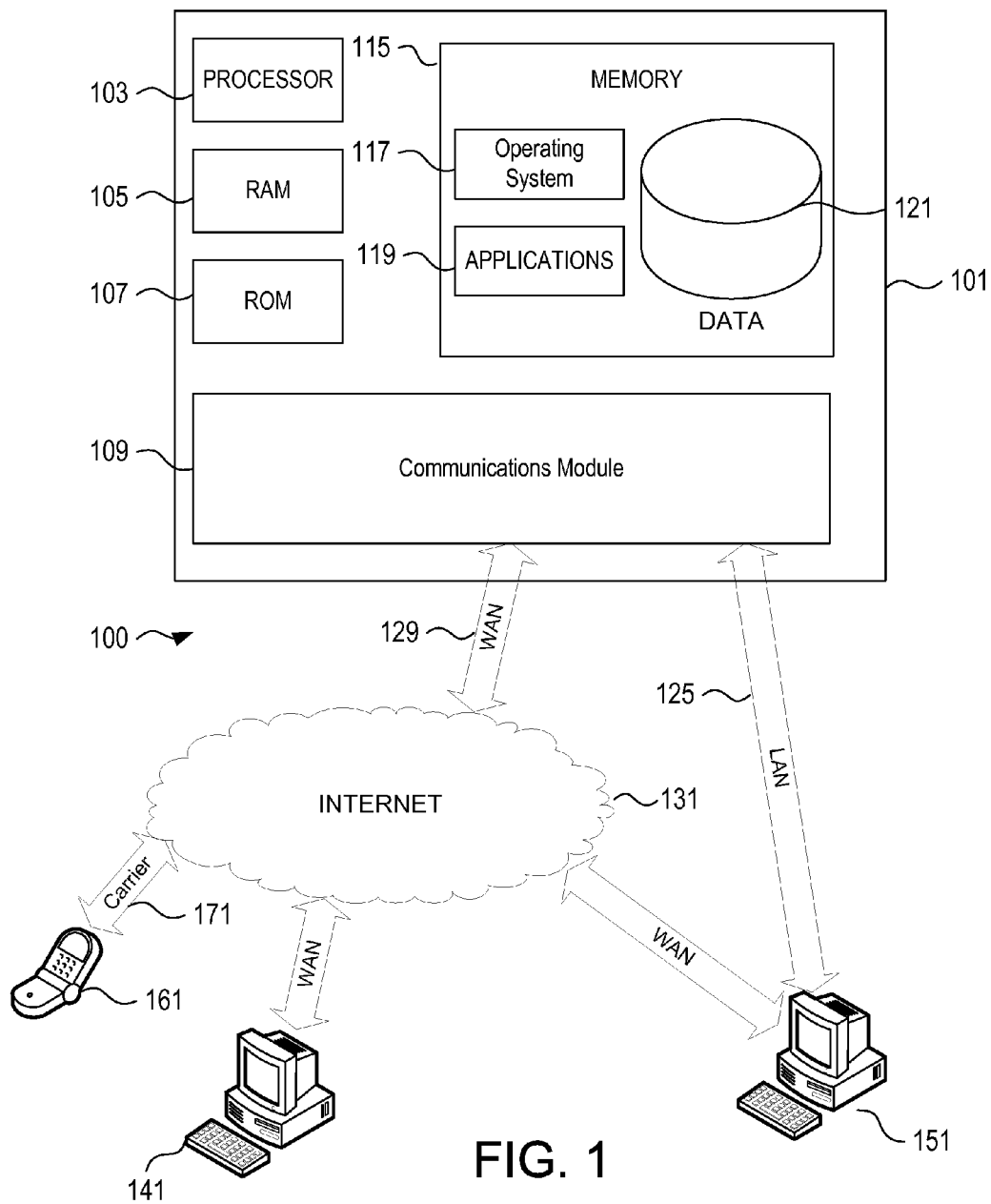
FIG. 1 shows an illustrative operating environment in which various aspects of the invention may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality of the invention. The computing system environment 100 should not be interpreted as having any dependency or requirement relating to any one or combination of components shown in the illustrative computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts, and the like to digital files.

Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). Database 121 may provide various information including attributes about service providers and characteristics about different service providers that may be received from different points in system 100, e.g., computers 141 and 151 or from communication devices, e.g., communication device 161.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101. Branch computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. The network connections may also provide connectivity to a CCTV or image/iris capturing device.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 101. Such a processor may execute computer-executable instructions stored on a computer-readable medium.

Figure 2:
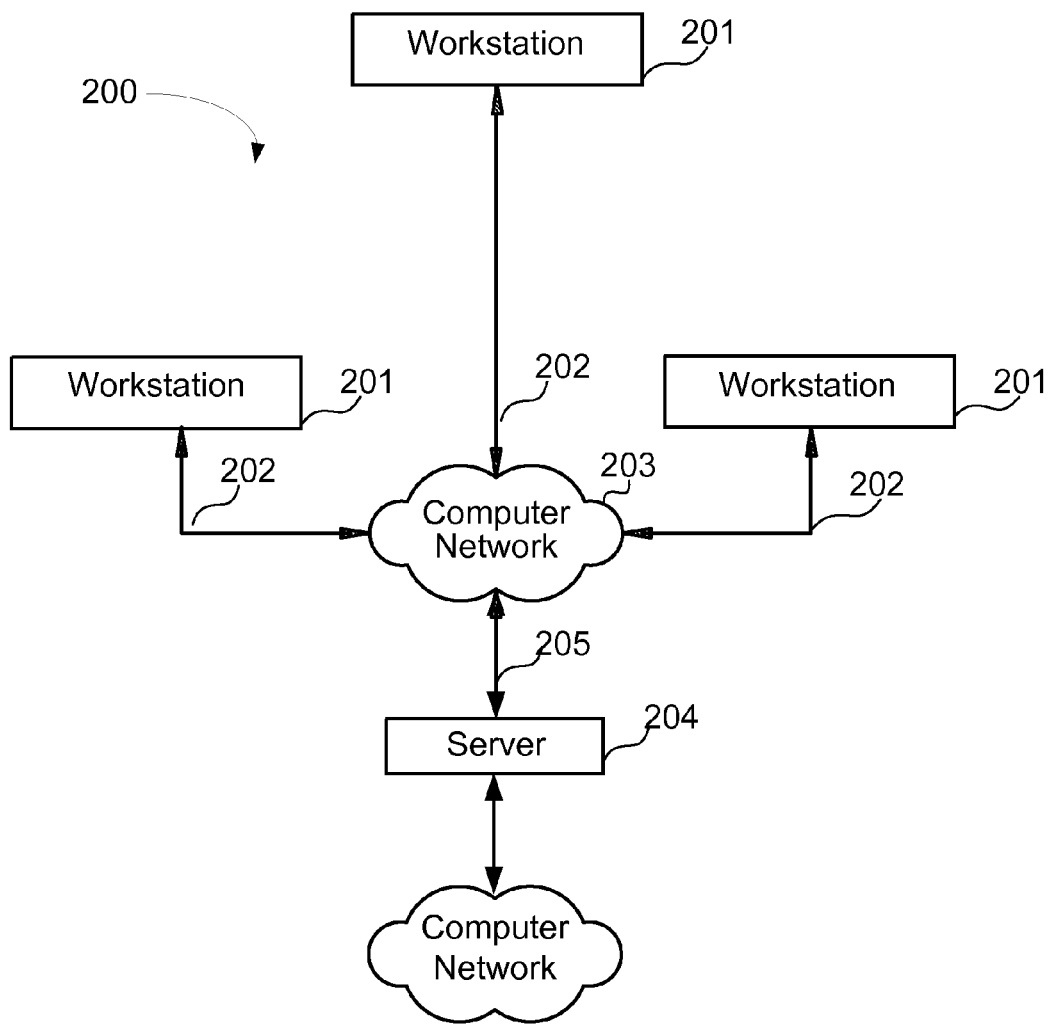
FIG. 2 is an illustrative block diagram of workstations and servers that may be used to implement the processes and functions of certain aspects of the present invention.

Referring to FIG. 2, an illustrative system 200 for implementing methods according to the present invention is shown. The system 200 may be a service provider system in accordance with aspects of this invention. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and/or hard-wired links. Connectivity may also be supported to a CCTV or image/iris capturing device.

The steps that follow in the figures may be implemented by one or more of the components in FIGS. 1 and 2 and/or other components, including other computing devices.

An aspect of the invention provides a method and/or process for storing and utilizing state information for service providers. An additional aspect of the invention provides a method and/or process for storing and utilizing web-based cookies for service providers.

Figure 3:
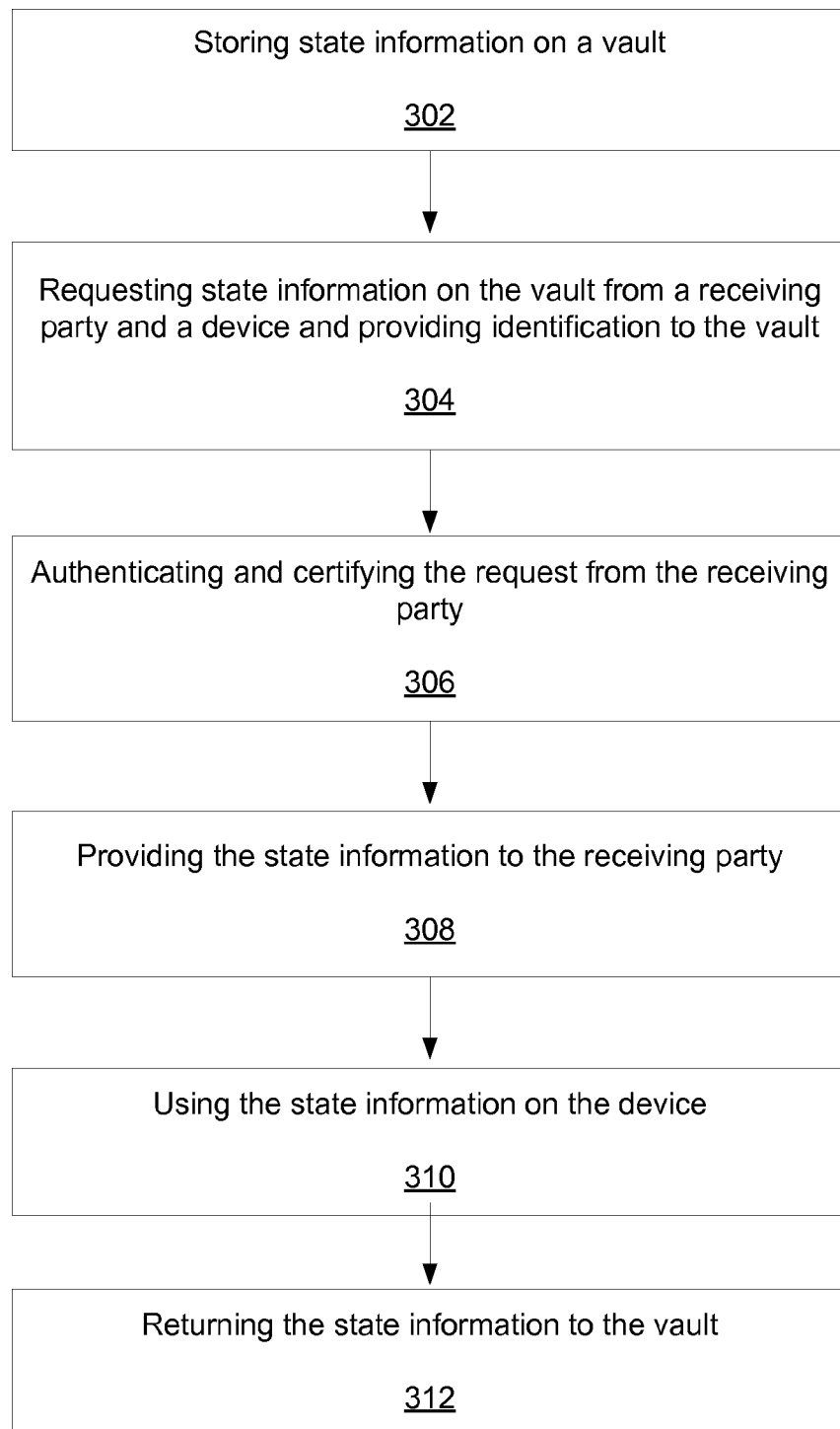
FIG. 3 illustrates a flow chart for storing and utilizing state information for service providers in accordance with aspects of the invention.

FIG. 3 shows a flow chart for a method and/or process for storing and utilizing state information for service providers. As illustrated in FIG. 3, the method may include one or more of the following steps: 1) storing state information on a vault 302; 2) requesting state information on the vault from a receiving party and a device and providing identification to the vault 304; 3) authenticating and certifying the request from the receiving party 306; 4) providing the state information to the receiving party 308; 5) using the state information on the device 310; and 6) returning the state information to the vault 312.

FIG. 3 illustrates the first step in the process, storing state information on a vault 302. The vault may be an electronic vault, which is an electronic repository to store cookies. The vault may be encrypted to ensure that the state information is kept secure and safe. Additionally, in other aspects of this invention, the vault may also be a cloud environment. In yet other aspects of this invention, the state information may be web-based cookies. Users may be able to set preferences on the cookies such as an address or credit card information for identification.

FIG. 3 illustrates another step in the process, requesting state information on the vault from a receiving party and a device and then providing that identification to the vault 304. During this step, after the state information has been stored on a vault, a receiving party may request state information on the vault. Additionally, a device from a receiving party may request state information on the vault. After the request for state information has been completed by the receiving party and/or a device, the receiving party or the device may then provide identification to the vault. The identification of the receiving party or the device may include address or credit card information or other pieces of identification information. As was described above, the state information may be web-based cookies. Additionally, as was described above, the electronic vault may also be a cloud environment.

FIG. 3 illustrates another step in the process, authenticating and certifying the request from the receiving party 306. During this step, after the state information has been identified, the request from the receiving party may be authenticated and certified by a processor or a receiving party system 200 as described above. The certification and authentication may follow specific rules previously input into the receiving party system 200.

FIG. 3 illustrates another step in the process, providing state information to the receiving party 308. During this step, after the request from the receiving party has been authenticated and certified, the state information is provided to the receiving party from the vault. The state information may be released from the vault and sent to and provided to the receiving party. As was described above, the state information may be web-based cookies. Additionally, as was described above, the electronic vault may also be a cloud environment.

FIG. 3 illustrates another step in the process, using the state information on the device 310. During this step, after the state information has been provided and sent from the electronic vault to the receiving party, the state information may now be utilized or used by the receiving party. The receiving party may use the state information on a device. The receiving party may use the state information in other manners without departing from this invention. As was described above, the state information may be web-based cookies. Additionally, as was described above, the electronic vault may also be a cloud environment.

FIG. 3 illustrates another step in the process, a last step in the process, returning the state information to the vault 312. In this step, after the receiving party has used the state information, the state information may be returned to the vault. The state information may be returned to the electronic vault so that the state information can be utilized again by another receiving party. As was described above, the state information may be web-based cookies. Additionally, as was described above, the electronic vault may also be a cloud environment.

Figure 4:
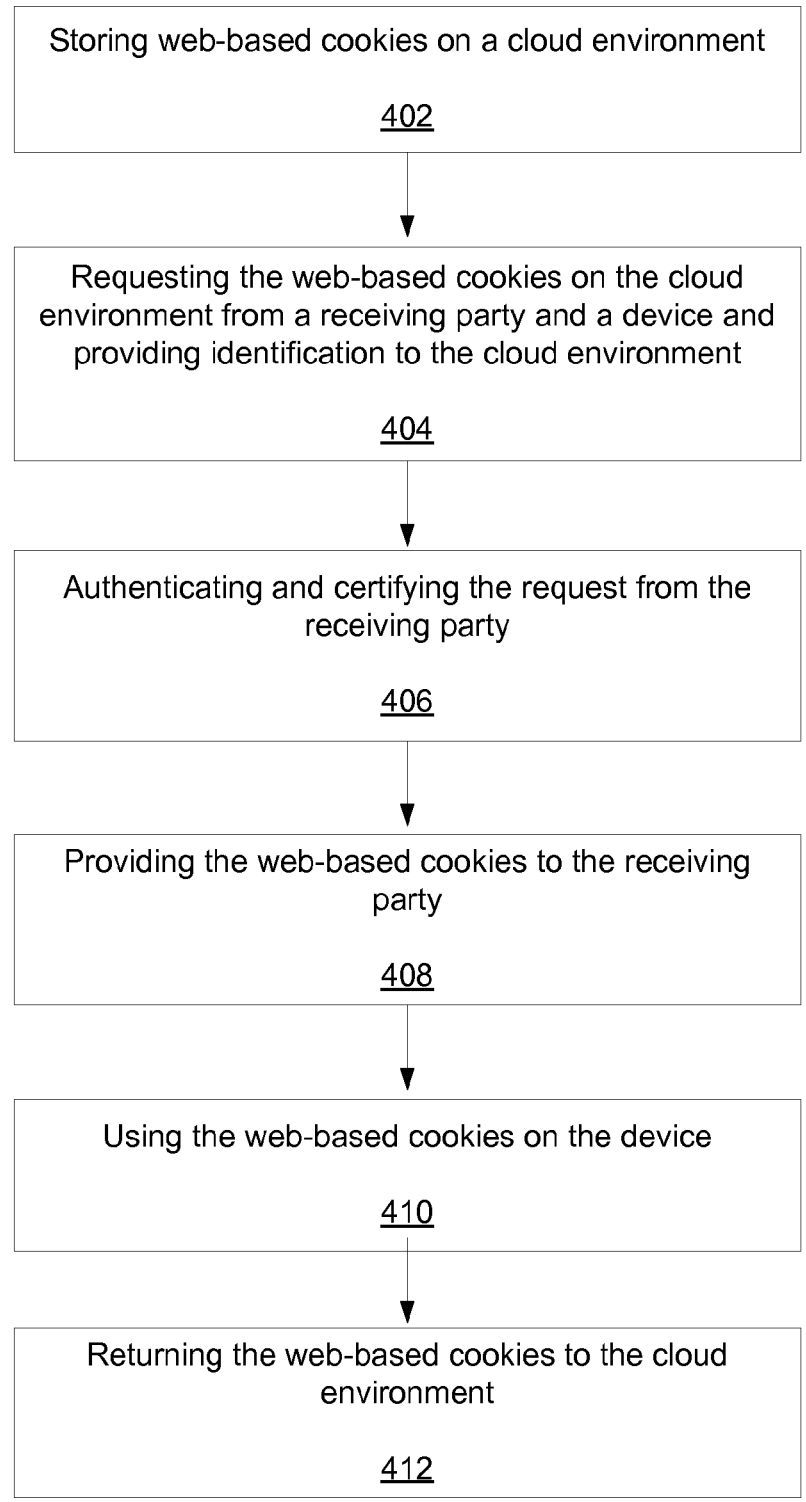
FIG. 4 illustrates another flow chart for storing and utilizing state information for service providers in accordance with aspects of the invention.

In another embodiment of this invention, FIG. 4 shows a flow chart for another method and/or process in accordance with this invention. As illustrated in FIG. 4, the method may include one or more of the following steps: 1) storing web-based cookies on a cloud environment 402; 2) requesting the web-based cookies on the cloud environment from a receiving party and a device and providing identification to the cloud environment 404; 3) authenticating and certifying the request from the receiving party 406; 4) providing the web-based cookies to the receiving party 408; 5) using the web-based cookies on the device 410; and 6) returning the web-based cookies to the cloud environment 412.

FIG. 4 illustrates the first step in the process, storing web-based cookies on a cloud environment 402. Generally, the cloud environment may provide a central location to store, upload, and download documents, data, or web-based cookies or state information. The cloud environment may be a server located at a remote location. The end users may access the cloud environment through a web browser or the internet. The cloud environment may be encrypted to ensure that the web-based cookies are kept secure and safe. Additionally, in other aspects of this invention, the cloud environment may also be an electronic vault. In yet other aspects of this invention, the web-based cookies may be state information associated with the user. Users may be able to set preferences on the cookies such as an address or credit card information, which may be used for identification.

FIG. 4 illustrates another step in the process, requesting the web-based cookies on the cloud environment from a receiving party and a device and then providing that identification to the cloud environment 404. During this step, after the web-based cookies have been stored on the cloud environment, a receiving party or relying party may request state information on the cloud environment. Additionally, a device from a receiving party may request the web-based cookies on the cloud environment. After the request for web-based cookies has been completed by the receiving party and/or a device, the receiving party or the device may then provide identification to the cloud environment. The identification of the receiving party or the device may include address or credit card information or other pieces of identification information.

FIG. 4 illustrates another step in the process, authenticating and certifying the request from the receiving party 406. During this step, after the web-based cookies have been identified, the request from the receiving party may be authenticated and certified by a processor or a receiving party system 200 as described above. The certification and authentication may follow specific rules previously input into the receiving party system 200.

FIG. 4 illustrates another step in the process, providing web-based cookies to the receiving party 408. During this step, after the request from the receiving party has been authenticated and certified, the web-based cookies may be provided to the receiving party from the cloud environment. The web-based cookies may be released from the cloud environment and sent to and provided to the receiving party.

FIG. 4 illustrates another step in the process, using the web-based cookies on the device 410. During this step, after the web-based cookies have been provided and sent from the cloud environment to the receiving party, the web-based cookies may now be utilized or used by the receiving party. The receiving party may use the web-based cookies on a device. The receiving party may use the web-based cookies in other manners without departing from this invention.

FIG. 4 illustrates another step in the process, a last step in the process, returning the web-based cookies to the cloud environment 412. In this step, after the receiving party has used the web-based cookies, the web-based cookies may be returned to the cloud environment. The web-based cookies may be returned to the cloud environment so that the web-based cookies can be utilized again by another receiving party.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

We claim:
1. A method, comprising:
storing, by a computing system and in an electronic vault of a cloud-computing environment, a set of state information received from a computing device, the set of state information comprising a web-browser cookie comprising credit-card information;
receiving, by the computing system and from the computing device, a request for the set of state information comprising the web-browser cookie, the request comprising the credit-card information;
authenticating, by the computing system and based on the credit-card information, the request; and
responsive to authenticating the request based on the credit-card information, providing, by the computing system and to the computing device, the set of state information comprising the web-browser cookie.

2. The method of claim 1, wherein authenticating the request comprises determining that the request, received from the computing device, and the web-browser cookie, stored in the electronic vault of the cloud-computing environment, both comprise the credit-card information.

3. The method of claim 1, comprising:
receiving, by the computing system and from a different computing device, a subsequent request for the set of state information comprising the web-browser cookie, the subsequent request comprising the credit-card information;
authenticating, by the computing system and based on the credit-card information, the subsequent request; and
responsive to authenticating the subsequent request based on the credit-card information, providing, by the computing system and to the different computing device, the set of state information comprising the web-browser cookie.

4. The method of claim 1, wherein the set of state information comprises one or more user preferences set by a user of the computing device and stored by the computing device in the web-browser cookie.

5. The method of claim 4, wherein the one or more user preferences comprise the credit-card information, an address, and one or more other items of identification information.

6. The method of claim 1, comprising encrypting, by the computing system, the set of state information comprising the web-browser cookie.

7. The method of claim 1, wherein the computing device comprises a mobile device.

8. A system, comprising:
a cloud-computing environment comprising an electronic vault; and
at least one processor; and
a memory storing instructions that when executed by the at least one processor cause the system to:
store, in the electronic vault, a set of state information received from a computing device, the set of state information comprising a web-browser cookie comprising credit-card information;
receive, from the computing device, a request for the set of state information comprising the web-browser cookie, the request comprising the credit-card information;
authenticate, based on the credit-card information, the request; and responsive to authenticating the request based on the credit-card information, provide, to the computing device, the set of state information comprising the web-browser cookie.

9. The system of claim 8, wherein the instructions, when executed by the at least one processor, cause the system to authenticate the request based on a determination by the system that the request, received from the computing device, and the web-browser cookie, stored in the electronic vault of the cloud-computing environment, both comprise the credit-card information.

10. The system of claim 8, wherein the instructions, when executed by the at least one processor, cause the system to:
receive, from a different computing device, a subsequent request for the set of state information comprising the web-browser cookie, the subsequent request comprising the credit-card information;
authenticate, based on the credit-card information, the subsequent request; and
responsive to authenticating the subsequent request based on the credit-card information, provide, to the different computing device, the set of state information comprising the web-browser cookie.

11. The system of claim 8, wherein the set of state information comprises one or more user preferences set by a user of the computing device and stored by the computing device in the web-browser cookie.

12. The system of claim 11, wherein the one or more user preferences comprise the credit-card information, an address, and one or more other items of identification information.

13. The system of claim 8, wherein the instructions, when executed by the at least one processor, cause the system to encrypt the set of state information comprising the web-browser cookie.

14. The system of claim 8, wherein the computing device comprises a mobile device.

15. One or more non-transitory computer-readable media having instructions stored thereon that when executed by one or more computers cause the one or more computers to:
store, in an electronic vault of a cloud-computing environment, a set of state information received from a computing device, the set of state information comprising a web-browser cookie comprising credit-card information;
receive, from the computing device, a request for the set of state information comprising the web-browser cookie, the request comprising the credit-card information;
authenticate, based on the credit-card information, the request; and
responsive to authenticating the request based on the credit-card information, provide, to the computing device, the set of state information comprising the web-browser cookie.

16. The one or more non-transitory computer-readable media of claim 15, wherein the instructions, when executed by the one or more computers, cause the one or more computers to authenticate the request based on a determination by the one or more computers that the request, received from the computing device, and the web-browser cookie, stored in the electronic vault of the cloud-computing environment, both comprise the credit-card information.

17. The one or more non-transitory computer-readable media of claim 15, wherein the instructions, when executed by the one or more computers, cause the one or more computers to:
receive, from a different computing device, a subsequent request for the set of state information comprising the web-browser cookie, the subsequent request comprising the credit-card information;
authenticate, based on the credit-card information, the subsequent request; and
responsive to authenticating the subsequent request based on the credit-card information, provide, to the different computing device, the set of state information comprising the web-browser cookie.

18. The one or more non-transitory computer-readable media of claim 15, wherein the set of state information comprises one or more user preferences set by a user of the computing device and stored by the computing device in the web-browser cookie.

19. The one or more non-transitory computer-readable media of claim 18, wherein the one or more user preferences comprise the credit-card information, an address, and one or more other items of identification information.

20. The one or more non-transitory computer-readable media of claim 15, wherein the instructions, when executed by the one or more computers, cause the one or more computers to encrypt the set of state information comprising the web-browser cookie.

* * * * *